Figure 1:
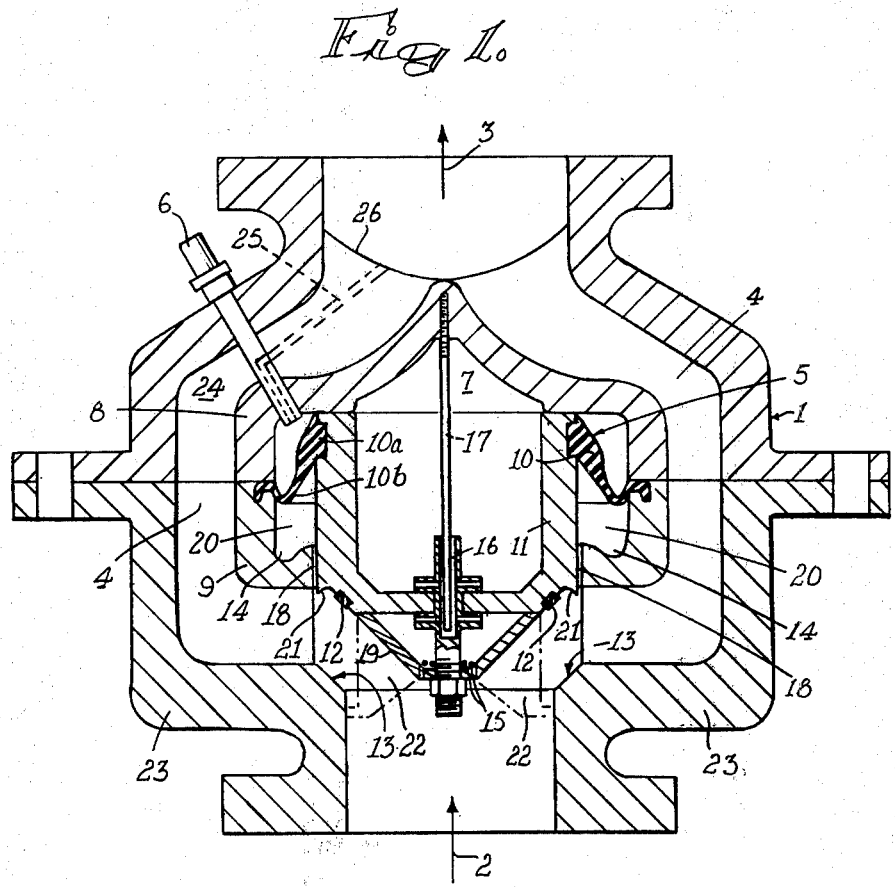

United States Patent [19]

Dawson

[11] 3,974,849
[45] Aug. 17, 1976

[54] DIAPHRAGM VALVES

[76] Inventor: Peter L. Dawson, 5 Chenik St., Shandor Industrial Sites, Krugersdorp, Transvaal, South Africa

[22] Filed: Sept. 4, 1974

[21] Appl. No.: 503,102

[52] U.S. Cl. .............................. 137/221; 251/30; 251/46; 251/61; 92/98 D; 92/105
[51] Int. Cl.² ....................................... F16K 31/165
[58] Field of Search .................... 137/219, 221, 491; 251/30, 35, 43, 46, 61, 61.1; 92/98 D, 105

[56] References Cited
UNITED STATES PATENTS

| 862,867 | 8/1907 | Eggleston | 251/61 |
|---|---|---|---|
| 1,115,100 | 10/1914 | Peet et al. | 251/46 |
| 2,623,542 | 12/1952 | Obermaier | 251/30 |
| 2,882,006 | 4/1959 | Reinecke | 251/30 |
| 3,023,996 | 3/1962 | Robertson | 251/46 |
| 3,076,471 | 2/1963 | Salerno | 251/35 |
| 3,367,621 | 2/1968 | Griswold | 251/35 |
| 3,459,403 | 8/1969 | Royer | 251/46 |
| 3,674,237 | 7/1972 | Heyer et al. | 251/43 |
| 3,712,578 | 1/1973 | Dawson | 251/35 |
| 3,818,928 | 6/1974 | Carsten | 137/491 |
| 3,893,475 | 7/1975 | Hudson | 251/46 |

FOREIGN PATENTS OR APPLICATIONS 1,245,356  9/1971  United Kingdom ................ 92/98 D Primary Examiner—Martin P. Schwadron
Assistant Examiner—G. L. Walton
Attorney, Agent, or Firm—Shoemaker and Mattare, Ltd.

[57] ABSTRACT

A valve assembly comprises a body having an inlet and an outlet, a chamber between the inlet and the outlet, a valve diaphragm fitted in the valve body and attached to a rigid closure member adapted to close the inlet with the periphery of the diaphragm supported by a wall of the chamber, and an auxiliary control, or pilot valve communicating with the chamber, said diaphragm comprising an annular member of rubber-like material with a thin outer peripheral portion and a thickened inner portion.

10 Claims, 2 Drawing Figures

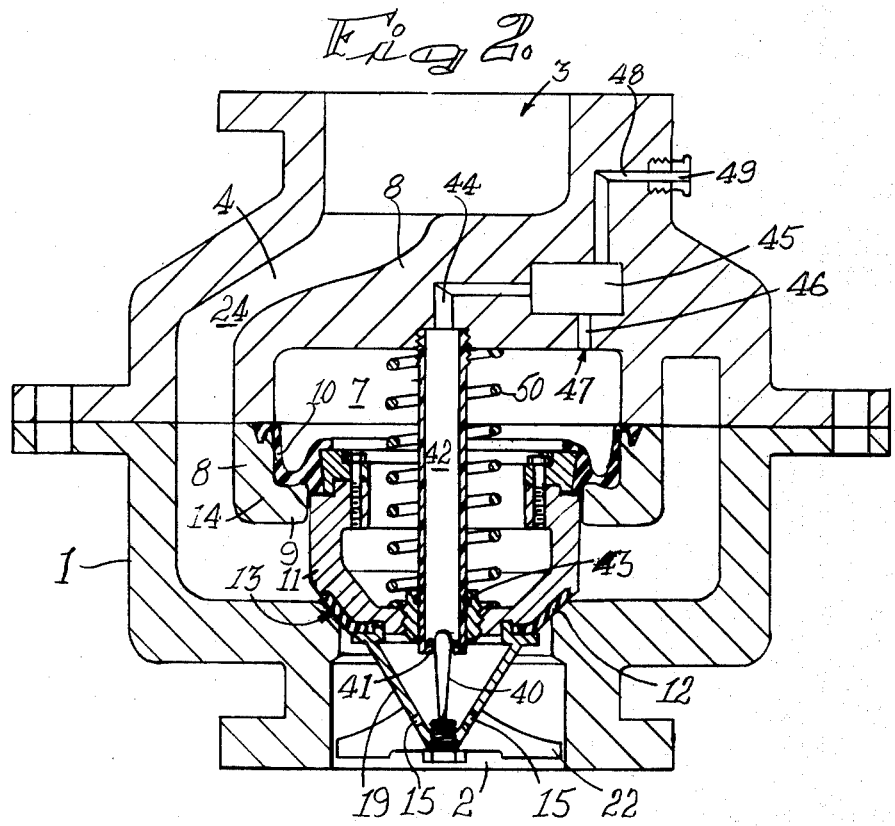

DIAPHRAGM VALVES

This invention relates to valves having diaphragm supported closure members and more particularly to valves which are adapted to control the flow of fluids in pipelines and which are operable by flexing of the diaphragm.

In known types of diaphragm valves it is desirable that the periphery of the diaphragm is of flexible rubber or like material to prevent fracture thereof due to continuous transverse oscillations during use. However, the central portion of the diaphragm which usually constitutes the valve face, should preferably be of hard rubber in order to withstand wear against the valve seat.

Generally, the valve face and the peripheral portion of diaphragm valves are made integral and the rubber composition of the diaphragm must be a compromise between flexible and hard rubber or like material. This does not result in an ideal valve since either the diaphragm wears too quickly or the diaphragm fails at the periphery.

It is the object of this invention to provide a diaphragm valve which will at least diminish the above-mentioned difficulties.

According to this invention there is provided a diaphragm for a valve comprising an annular member of rubber-like material with a thin outer portion adapted to be secured to a valve casing and an inner portion having a thickened cross-section, the free edge of which is adapted to be secured to a rigid valve closure member.

Further features of the invention provide a diaphragm assembled with a rigid closure member in which the valve face on the rigid closure member is of hard rubber-like material, and in which the closure member is hollow and tapered on the inlet side and is shaped as a cone. In the latter case apertures are provided through the cone to connect the inlet of a valve assembly with the inside of the closure member.

An optional feature of the invention provides for the closure member to have a deflecting lip formed around the outer edge thereof.

The invention also provides a valve assembly comprising a body having an inlet and an outlet, a chamber between the inlet and the outlet, a valve diaphragm as defined above fitted in the valve body adapted to close the inlet with the periphery of the diaphragm supported by a wall of the chamber and an auxiliary control valve communicating with the chamber.

These and other features of the invention will become apparent from preferred embodiments thereof described below by way of example only. In these embodiments reference is made to the accompanying drawings in which:

FIG. 1 is a cross-sectional side elevation of a valve assembly in the open position; and FIG. 2 is a cross-sectional side elevation of an alternative valve assembly in the closed position.

With reference to FIG. 1 of the drawings a valve assembly comprises a valve body 1 including an inlet 2 at one end and an outlet 3 at the opposite end aligned with the inlet. A passage 4 through the valve connects the inlet to the outlet. A diaphragm 5 is arranged to support a closure member to control the inlet 2. The diaphragm 5 and closure member are, in turn, controlled by a pilot valve 6 associated with a chamber 7 in the body 1 on the opposite side of the diaphragm 5 to the closure member.

The chamber 7 is formed by an inner wall 8 of the valve body, which wall also defines the passage 4. The wall 8 extends upstream beyond the diaphragm and forms a support 9 for the diaphragm as described more fully below.

The diaphragm 5 and closure member are circular in plan as is usual in valves of this type and the diaphragm is an annular member 10 of flexible rubber or suitable rubber-like material and is located around the closure member 11 which is rigid. The outer edge of the annular member 10 is channel shaped to engage the wall 8 of the chamber 7 to form a seal therewith. The inner portion 10a of the annular member 10 is thicker than the outer portion 10b. The inner portion 10a therefore strengthens the annular member while the thin outer portion provides the required flexibility.

The inner edge of the diaphragm is bonded to the side of the closure member 11 and forms a seal therewith. Thus the flexible annular member 10 supports the rigid closure member 11 which is slidably mounted and guided in the valve body 1.

As illustrated in FIG. 1 the transition from the outer and thinner portion of the annular member to the inner and thicker portion thereof is preferably chosen so that the included angle between the outer surfaces of the rubber at the commencement of the thickened portions may for example, be in the range of 28° to 35°. No sudden changes in section which could weaken the diaphragm are made. This is necessary since the diaphragm has a relatively small radial dimension.

The end of the closure member facing the inlet is provided with a valve face 12 arranged to co-operate with a valve seat 13 in the valve body 1. The valve face 12 preferably consists of a ring of hard rubber or rubber-like material which will withstand wear during use.

Axial sliding of the closure member in the valve with respect to the inlet and outlet will open or close the valve assembly. It will be appreciated that the flexible annular member 10 is designed to flex repeatedly without fracturing whereas the valve seat 12 is designed to withstand wear. It is considered that the life of the diaphragm 5 will be greater than that presently attainable with existing diaphragms and valve maintenance is thereby reduced. Also higher working pressure differentials can be accommodated with the diaphragm as above described.

In the closed and primed position of the valve the flexible annular member 10 rests on the support 9 and in order to reduce fatigue resulting from the repeated flexing of the flexible member the part 14 of the support directly under the member is recessed. This induces a measure of initial tension to the flexible member 5 when in the closed position and when the chamber 7 is filled with fluid under the pressure from the inlet.

The end of the closure member facing the inlet 2 is conically shaped as at 19 and the valve seat 13 is tapered parallel to the coned closure member. An annular formation of apertures 15 is provided in the streamlined conical end of the closure member in the vicinity of its apex. These apertures connect the inlet 2 of the valve with an axial passage 16 through the closure member into the chamber 7. The passage is kept clear of any impurities by a pintle 17 secured to the inner chamber 7 wall and extending into the passage 16. Movement of the closure member 11 will also cause movement of the passage 16 over the pintle 17 thereby maintaining the passage clear.

It will be appreciated that the conical shape of the closure member 11 will afford a streamlined flow in the valve body 1. The location of the annular formation of apertures, 15 tends to induce a pressure in the chamber 7 which is higher than the inlet by virtue of kinetic energy losses as the fluid is deflected over the conical shape into the body 1 of the valve. This facilitates closing of the valve during use.

The support 9 for the diaphragm which may also form a guide for the closure member 11 is provided with a clearance 18 with the closure member 11 such that the space 20 defined between the support 9 and the diaphragm 5 is easily filled and emptied by the fluid, when the valve is in use. In order to facilitate the emptying of the space 20 and consequently the closing operation of the valve, the edge of the closure member may have a peripheral deflecting lip 21. Thus, when the valve is in the open position as shown, the flow of fluid from the inlet is deflected away from the edge of the closure member 4 such that there is a reduced pressure induced in space 20 as compared to that in the flow passage remote from the lip 21.

This reduced pressure effect also assists in closing the valve when the outlet from chamber 7 is closed and avoids the necessity for including biasing springs in chamber 7. Biasing springs may however be included in chamber 7 if required.

Because of the clearance 18 between the support 9 and the closure member 11 it may be necessary in the bigger type of valves to have webs 22 on the closure member 11 to guide the latter when co-operating with the inlet. These are shown in dotted lines in FIG. 1 of the drawings and are adapted to co-operate with the wall of the inlet 2. These webs can, however be used to advantage in all valves.

It will be noted that the deflecting lip 21 tends to direct the fluid flow onto the outer wall of the valve. In high pressure applications and where abrasive fluids are to be controlled this may cause considerable wear in the wall. The region 23 of the wall affected by the flow is therefore made thicker to accommodate wear.

A pilot valve 6 is located through the body 1 of the valve to extend into the chamber 7 on the opposite side of the diaphragm to the inlet. In order not to interfere with the flow through the passage, the valve is located through a web 24 supporting the chamber wall 8 of the valve. The pilot 6 controls a passage 25 extending from the chamber to the outlet 3 of the valve. The passage 25 conveniently extends through the web to its downstream edge 26 such that the main flow divided by the web will give rise to a decrease in pressure at the passage outlet. The pressure decrease will tend to draw the fluid from the chamber 7 through the passage 25 thereby facilitating the flow therethrough. This in turn facilitates movement of the closure member off the valve seat. In alternative constructions particularly pressure reducing valves the outlet from the chamber will be chosen to give the least possible resistance to flow from the chamber and may open directly into the outlet from the valve. When the valve is in the closed position, with the pilot valve closed, the pressure at the inlet 2 is transmitted to the chamber 7 by means of the annular formation of holes 15 and the axial passage 16. Thus, the static pressure in the chamber 7 will be equal that at the inlet 2. As the surface area of the diaphragm 5 is greater than the cross-sectional area of the inlet, the valve will be urged to the closed position.

To open the valve, the pilot valve 6 is opened, whereupon the pressure in the chamber 7 is reduced since the fluid in the chamber will escape through the passage 25 in the web 24. Consequently, the pressure on the closure member 11 at the inlet 2 will urge the valve open. The flow through the valve body and over the web 24 will act to draw the fluid from the chamber 7 thereby assisting in opening the valve.

The valve is closed by closing the pilot valve 6. In this case the chamber 7 will be filled with fluid and pressure will build up therein until the force on the diaphragm 5 due to the chamber pressure exceeds that due to the inlet pressure. It will be noted that the lip 21 if included will deflect the flow to afford a decreased pressure in space 20 thereby facilitating the removal of any fluid therein.

A further embodiment of the invention is now described with reference to FIG. 2. In this case, the valve assembly is similar to that described above and equivalent components are similarly numbered. In this case, however, the lips 21 on the closure member 11 are not included but the clearance 18 between the closure member and the chamber wall 8 is maintained. The valve face 12 and seat 13 are not inclined parallel to the side of the conical formation 19 of the closure member.

Furthermore, in this embodiment, a removable tapered pintle 40 attached to the cone 19 projects into the hollow interior of member 19 to move in a guide 41. The guide 41 is located in the end of a resilient tubular member 42 which depends into chamber 7 from wall 8.

The closure member 11 has an opening therethrough including a seal 43 adapted to slide along the resilient tubular 42 during opening and closing of the valve.

The fixed end of the resilient member 42 communicates with by-pass passage 44 controlled for fluid flow by an auxiliary valve indicated generally at 45. The valve 45 is preferably adapted to be solenoid controlled for automatic operation which in turn automatically controls the operation of the main valve.

The valve 45 communicates through a passage 45 opening into the chamber 7 at 47 and also an outlet passage-way 48 which terminates either externally of the valve body 1 as shown at 49 or it may be made through one of the ribs 24 to open into the outlet 3 for the main valve.

The opening 47 is located so that it is not interfered with by the diaphragm 10 even the main valve is fully open and a compression spring 50 may be included in chamber 7 to assist in initial closing of the valve from the fully open position.

In the position shown water under pressure from the inlet 2 has passed through apertures 15 in conical member 19 and passed pintle 40 through the resilient tubular member 42 and valve 45 to enter chamber 7 through opening 47. This fluid pressure has caused the closure member 11 to seal in the inlet 2 to the valve prevent flow through the valve.

It will be appreciated that the tapered shape of the pintle 40 ensures that less fluid flows through the member as the closure member 11 approaches the shut-off position. This reduces any tendency for a waterhammer effect in the pipeline in which the valve is installed. The shape of the pintle can be made to give particular closure characteristics to the valve and eliminate all practical waterhammer effect.

With the valve closed the full fluid pressure is exerted in the chamber 7 and tube 42 and the latter due to its inherent resilience tends to swell and result in a tight seal at 43.

Now to open the main valve, the auxiliary valve 45 is operated to close passage 44 and to open the path for fluid flow from chamber 7 by opening 47 and passageway 48 thus relieving the pressure in chamber 7.

Closure member 11 is then free to move under the pressure of fluid at the inlet of the valve thereby opening the valve.

To close the valve assembly the auxiliary valve is operated to close outlet passageway 48 and to open passage 44. Fluid can again flow into chamber 7 to cause the main valve to close until the condition as above described is again reached.

Obviously other embodiments of the invention are possible within its scope. In the latter embodiment, for instance, the pintle 40 could be fixed in the body of the assembly and a tubular element be fixed to the cone around the apertures 15 to project into the member 43 and to slide around the pintle, thereby ensuring a decreasing fluid flow through the member 43 as the closure member approaches shut-off.

From the above it will be appreciated that the valve includes features which ensure easy and satisfactory operation of the assembly over a wide range of operating fluid pressures.

What I claim as new and desire to secure by Letters Patent is:

1. A diaphragm operated valve, comprising: a valve body having an inlet and an outlet; and an inner wall within said valve body; a valve seat between the inlet and outlet; a rigid, reciprocable valve closure member movable in the valve body toward and away from the valve seat and having a hard, rubber-like seating surface for movement into and out of closing relationship with the valve seat; and a separate, annular valve-operating diaphragm of flexible, rubber-like material having an inner peripheral portion with an inner edge thereon and an outer peripheral portion with an outer edge thereon and secured around its inner edge to the closure member and around its outer edge to the valve body inner wall so that a chamber is defined between the inner wall and the diaphragm and closure member which chamber is located between the inlet and outlet; the closure member having an opening defined therein leading into the chamber; pilot valve means in fluid communication with said chamber to be operatively connected with said diaphragm to control application of fluid pressure to said diaphragm to operate said valve; the inner peripheral portion of the diaphragm having a thickness substantially greater than the outer peripheral portion thereof so that the diaphragm outer portion is thin relative to the diaphragm inner portion, the differences in thickness from the outer peripheral portion to the inner peripheral portion being gradual and free of stress-inducing sudden transitions; the valve body inner wall having an extension directed toward the closure member from the inner wall and located between the diaphragm and the inlet to define a ledge positioned to contact and accommodate the thin outer portion of the diaphragm when the valve is closed and fluid pressure is applied to the diaphragm for supporting the diaphragm thin portion when the valve is closed and pressure is applied to the diaphragm.

2. An assembly as in claim 1 wherein said ledge has a diaphragm contacting surface which is curved outwardly of the chamber to define a recess into which the diaphragm fits when the valve is closed to be flexed so that tension is induced in the diaphragm when the valve is closed.

3. An assembly as claimed in claim 1 in which the closure member is conically shaped on the inlet side and has apertures therethrough to connect said inlet with said chamber.

4. An assembly as claimed in claim 1 in which the side of the closure member facing the inlet is provided with guiding webs co-operating with the inlet.

5. An assembly as claimed in claim 1 in which the closure member is provided with a deflecting lip formed around an outer edge thereof shaped to deflect the flow of fluid through the assembly and thereby cause a decreased pressure zone in the chamber behind the diaphragm.

6. A valve assembly as claimed in claim 1 in which the pilot valve means is located through a web in the flow passage through the valve body and has an outlet in the downstream edge of the web.

7. A valve assembly as claimed in claim 1 in which the valve has an axial pintle fitting into a passage in the closure member so that movement of the closure member relative to the pintle will prevent clogging of the passage.

8. A valve assembly as claimed in claim 1 in which the assembly includes a resilient tubular member forming a bypass passage through the chamber communicating with apertures provided through the closure member, the closure member being slidable in sealing engagement along the tubular member and the pilot valve means being provided in the by-pass passage.

9. A valve assembly as claimed in claim 8 in which the pilot valve means has two terminal positions; in one position liquid from the by-pass passage being allowed into the chamber and in the other position the liquid in the chamber being allowed to escape outwardly.

10. A valve assembly as claimed in claim 8 in which a tapered pintle is provided with the narrow end of the pintle being attached to the closure member and the other end of the pintle projecting into the tubular member.

* * * * *